July 23, 1968
K. S. KORDIK ET AL
3,393,642
ADJUSTABLE SPEED PUMPING SYSTEM
Filed Aug. 31, 1966
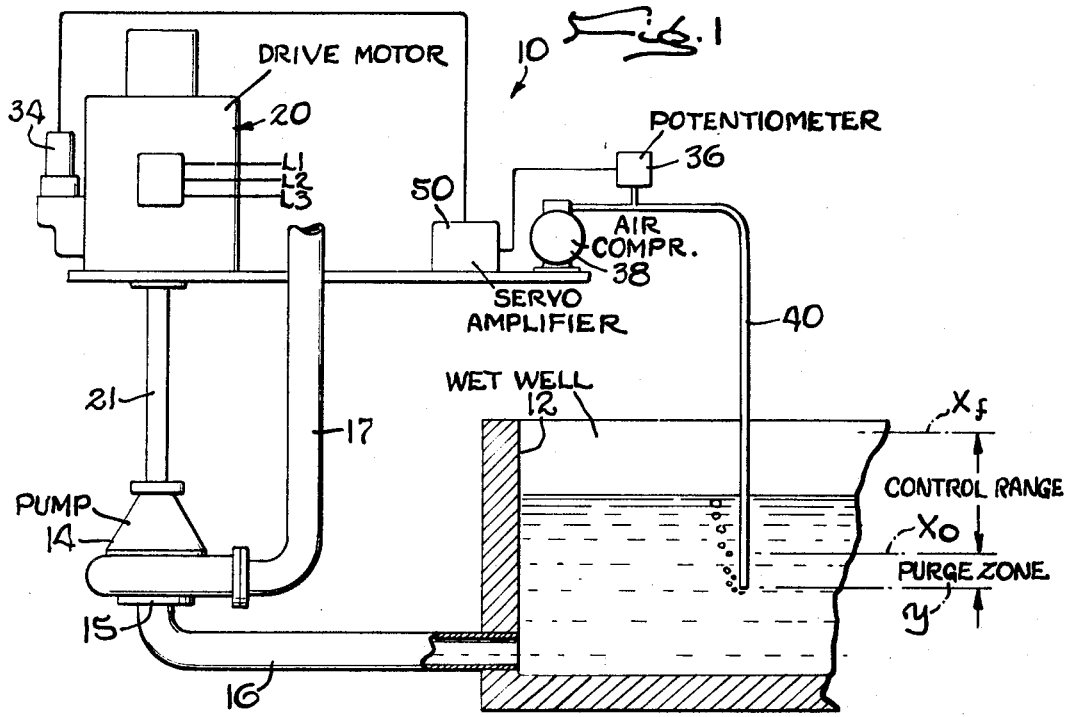
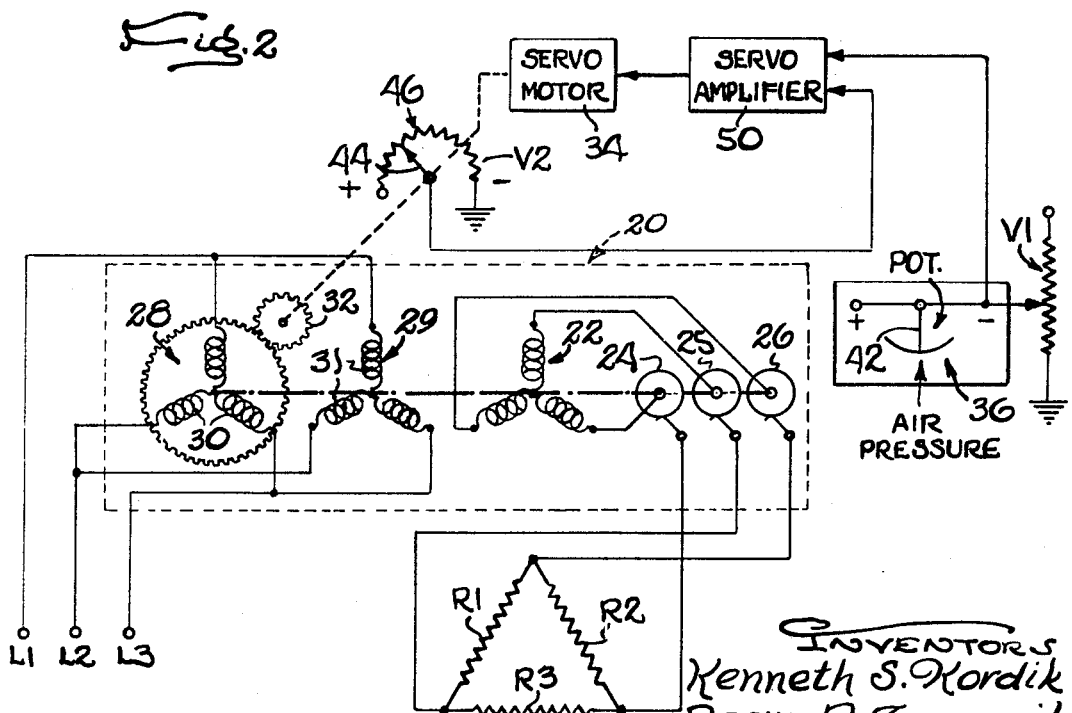
INVENTORS
Kenneth S. Kordik
Dean R. Zaumseil
by Wolfe, Hubbard, Voit & Osann
ATTORNEYS though invention has been described in connection
United States Patent Office
3,393,642
Patented July 23, 1968

3,393,642
ADJUSTABLE SPEED PUMPING SYSTEM
Kenneth S. Kordik, Rockton, and Dean R. Zaumseil,
Rockford, Ill., assignors, by mesne assignments, to
Bucyrus-Erie Company, South Milwaukee, Wis., a corporation of Delaware
Filed Aug. 31, 1966, Ser. No. 576,438
2 Claims. (Cl. 103—35)

ABSTRACT OF THE DISCLOSURE

A pumping system for sewage is shown having wet wells to which the sewage flows and a pump for pumping the sewage out of the wet wells. The pump is driven by an induction motor which has its field divided into two equal parts, one of which is rotatably adjustable to vary the speed and torque of the motor. A column of air under pressure in a tube submerged in the wet well provides feedback for indicating the depth of the fluid in the well. The column of air operates a variable resistor which emits an electrical signal that is compared with an electrical signal from a potentiometer representing the position of the movable stator on the motor and these two signals are prepared to drive a servo motor which moves the rotatable adjustable section of the motor field.

---

The present invention relates generally to fluid pumping methods and apparatus and more particularly, to an improved fluid pumping system of the type commonly employed to control liquid level in a well, reservoir or sump and the like. In its principal aspects, the invention is concerned with improved fluid pumping methods and apparatus characterized by their ability to automatically adjust the rate of fluid pumped in accordance with the demand upon the system.

Accordingly, it is a general aim of the present invention to provide an adjustable speed fluid pumping system which is characterized by its versatility and ability to automatically control the rate of fluid to be pumped according to demand on the system.

Yet another object of the invention is to provide a fluid pumping system wherein the pump speed is automatically adjusted to compensate for the amount of fluid required to be pumped as determined by sensing means employed in the system.

It is still another object to provide an apparatus for automatically adjusting the speed of fluid pumping to increase and decrease the flow rate of the pump in accordance with corresponding changes in delivery requirements of the system.

More specifically, it is an object of the present invention to provide an adjustable speed pumping system which employs a pump drive motor which is of the adjustable speed A-C type having flux linked primary and secondary windings and provision for reducing the induced voltage in the secondary winding from the motor rated value to control the speed-torque characteristics thereof.

Other objects and advantages of the invention will become apparent upon reading the attached detailed description and upon reference to the drawings in which:

FIG. 1 is a diagrammatic representation of an exemplary adjustable speed pumping system in accordance with the present invention; and FIG. 2 is a schematic circuit diagram of a control arrangement embodying the present invention.

While the invention has been described in connection with an exemplary embodiment, it will be understood that we do not intend to be limited to the embodiment shown, but intend to cover the various alternative and equivalent arrangements included within the spirit and scope of the appended claims.

Referring now to the drawings, there is shown in FIG. 1 an exemplary adjustable speed pumping system, generally indicated at 10, in accordance with the present invention, which is particularly suitable for use in controlling the level of water in a wet well 12 and the like. In order to pump fluid rising in well 12 out of the well, there is provided a centrifugal pump 14 having its inlet 15 connected to pump inlet conduit 16 leading to the base of the well and a pump outlet conduit 17 connected to a discharge or drain (not shown).

In accordance with one important aspect of the present invention, an adjustable speed motor drive means, generally indicated at 20, is provided to rotate the pump impeller through shaft 21 to pump fluid from inlet 16 to outlet 17. In the exemplary form of the invention, the adjustable speed pump drive includes an A-C motor of the type having flux linked primary and secondary windings, which may, for example, be a pair of stators acting upon a common rotor assembly. For the details of A-C adjustable speed motors of the type which may be advantageously utilized with the present invention, reference is made to copending United States application Ser. No. 558,035 filed June 16, 1966 and assigned to the assignee of the present invention.

Briefly stated, the motor 20, which is diagrammatically shown in FIG. 2, has a rotor winding 22 which is of the "wound" type having its leads brought out to slip rings 24–26, inclusive. Surrounding the rotor are stator assemblies 28, 29 having windings 30, 31, respectively, with their respective leads being brought out to a three phase power source indicated at L1, L2, L3. The stator assemblies 28, 29 which are telescoped over the rotor, produce rotating magnetic fields which induce current in the rotor, thereby creating a secondary rotor field, with the interaction of the stator fields and the secondary rotor field producing the rotation and torque of the motor.

For the purpose of adjusting the speed-torque characteristics of the motor, stator 29 is fixed, while stator 28 is rotatably mounted for positioning with respect to stator 29 in order to adjust the electrical phase relation between the voltages induced by the stators and the rotor winding. That is, stator 28 may be oriented with respect to stator 29 to produce a null phase position in which the voltages induced by the stators are opposite in phase and cancel one another so that the torque applied to the rotor is zero, the stator 28 may be adjusted to a position in which the induced voltages are additive for the production of maximum torque, or the stator 28 can be adjusted for any of an infinite number of resultant voltages between the maximum and null phase position.

In the embodiment of the illustrative motor shown in FIGS. 1 and 2, at least a portion of the outer periphery of the rotatable stator 28 includes gear teeth arranged to be driven by pinion 32 of rotatable servo motor 34, the latter being connected to a fixed surface which may, for example, be the motor housing.

Since the exemplary form of the motor described herein is preferably of the "wound" type in order to provide for dissipation of energy of slip in the form of heat safely outside the motor, there is provided external resistances R1, R2, R3 connected to the slip rings of rotor 22.

In carrying out the present invention, an automatic feed-back control is provided for delivering voltage signals to servo motor 34 to vary the stator position to increase and decrease the flow rate of the pump in accordance with the demand for pumped fluid. To this end, fluid level sensing means is employed to produce an output signal which varies in accordance with the level of fluid in well 12. Signal producing means coupled to servo motor 34 is employed to produce an output signal which varies in accordance with the position of the rotatable stator 28. The stator position output signal and the fluid level output signal are compared, amplified by means of an amplifier, and the net output signal of which is employed to energize the servo motor for corrective adjustment of the rotatable stator position thereby slowing down or speeding up the pump impeller to regulate the delivery of the pump.

In the present instance, fluid level in well 12 is sensed by pressure of the fluid acting on an air pressure operated potentiometer 36 where air pumped from compressor 38 through a column 40 extending into the well 12 is subjected to counter pressure from the fluid head above the lower end of the column. As shown diagrammatically in FIG. 2, air pressure within the column 40 acts against the wiper 42 of the potentiometer 36. The potentiometer 36 is initially set so that as the pressure in the column 40 is increased above a control pressure of air pumped by the compressor, due to the rising of the fluid level, wiper 42 is displaced so that a voltage V1 appears with the polarity indicated between the wiper and the lower end of the potentiometer.

Servo motor 34 is employed to displace the wiper 44 of a second potentiometer 46, so that a second voltage V2 appears with the polarity indicated between the wiper and the lower end of the potentiometer. Rotation of the pinion 32 to shift the stator 28 effects displacement of the wiper 44 to increase or decrease the voltage V2. The net control signal arrived at by combining the voltages from potentiometers 36, 46, as amplified by servo amplifier 50 actuates the servo motor 34 to either increase or decrease the relative position of stator 28 with respect to fixed stator 29 correspondingly increasing or decreasing the speed of rotor 22 and the pump impeller connected thereto.

Having in mind the foregoing exemplary structural details, a brief description of a typical fluid pumping operation will serve to facilitate an understanding of the present invention. To this end, reference is first made to FIG. 1 wherein the pumping system is shown, merely by way of example, with a particular application to pumping fluid from a wet well. It will be understood, however, that this is simply exemplary of the type of application to which the present pumping system may be applied and while it is shown for pumping fluid such as water from a well, the system could likewise be used for adjustable speed pumping of other fluids into a tank or reservoir, as well as for adjustable speed driving of other types of centrifugal loads such as fans, compressors, or blowers and the like.

The control air pressure through column 40 will be equilized when the fluid is at some distance $y$ above the end of column 40. Assuming that the pressure controlled potentiometer is balanced at a lower limit of fluid level which is to be pumped, this lower limit is then indicated at $X_o$. When the fluid level is below the lower limit $X_o$, the wiper 42 of the potentiometer has zero displacement and the control air pressure exceeds that of any counter pressure by the fluid level in the well. The zone between the end of the column and the level indicated $X_o$ may be called the "purge" zone as air is then just pumped through column 40 and the system is in equilibrium.

As the fluid level rises the pressure within column 40 increases so that wiper 42 of potentiometer 36 is displaced creating an output voltage signal which is applied through amplifier 50 to the servo motor 34 to rotate the stator 28 from its null phase position to a position where voltage is induced in the rotor of motor 20, thereby driving the pump 14. If the fluid level continues to rise and a greater displacement of potentiometer wiper 42 occurs then the stator 32 is shifted a greater amount to increase the speed of the motor and pump impeller. Continual rising of the liquid level toward the upper control limit indicated at $X_f$ causes a corresponding increase in displacement of stator 28 to increase the speed of the motor thereby increasing the delivery of the pump.

In order to balance the system, wiper 44 of potentiometer 46 is displaced as the stator 28 is shifted to effectively equalize the signal from the pressure potentiometer 36 so that the stator is not shifted further unless the wiper 42 is displaced to an even greater extent by rising fluid. When the fluid level decreases in the well 12, pressure potentiometer wiper 42 has a corresopnding decrease in displacement and with the voltage signal from potentiometer 46 now exceeding the voltage from potentiometer 36, the control signal to the servo motor is reversed and the stator is shifted back toward the null position. Thus, the speed-torque characteristics of the motor are automatically adjusted to correspondingly increase and decrease the delivery of the pump according to the raising and lowering of the water level in the well. Where the fluid is low and rising slowly the pump is operated at relatively low speed whereas as the fluid level rises toward the maximum height $X_f$, the motor speed and pump capacity are increased to pump fluid out of the well at an increased rate.

It will be apparent from the foregoing that there has been disclosed herein a novel fluid pumping system employing apparatus and methods which, although characterized by their simplicity and reliability, serve to insure an automatically controlled rate of fluid pumped according to the demand of the system. Not only does the unique arrangement of the automatic control and adjustable speed A-C motor contribute to such fluid pumping ability, but, moreover, there has herein been disclosed improved methods for adjusting the flow rate of the system whereby the fluid is pumped according to sensed demand for increased or decreased fluid flow rates.

We claim as our invention:

1. A fluid pumping system for controlling fluid flow rate comprising, in combination, means including a pump connected to a fluid source, an adjustable speed A-C motor for driving said pump, said motor including at least one magnetic circuit having flux-linked primary and secondary windings whereby a voltage is induced in said secondary winding, means for varying the induced voltage in the secondary winding between the motor rated speed value and a zero motor speed, said adjustable speed motor further including first and second stator assemblies, a rotor having a single set of windings in which said secondary voltages are induced by the stator fields, at least one of said stator assemblies being rotatably movable between said motor rate speed value and said zero motor speed positions, said motor speed adjusting means including a servo motor for rotatably positioning said movable stator, level sensing means for determining the flow rate of fluid, and control means coupled to said sensing means and said motor speed adjusting means, said sensing means including a pressure operated potentiometer for producing an output signal to said control means according to the sensed change of fluid level, said servo motor including means for producing an output signal to said control means according to the position of the rotatable stator and said control means being operative to produce a net output signal to said servo motor for correction adjustment of the rotatable stator whereby the motor speed is adjusted to regulate the delivery of said pump.

2. A fluid pumping system for controlling fluid rate comprising:
  a reservoir for fluid adapted for flow of said fluid to maintain a level of said fluid in said reservoir within a predetermined range;
  a fluid pump to effect said flow of said fluid;
  a variable speed A-C motor for driving said fluid pump, having a rotor and a stator, at least a portion of said stator being rotatably movable to vary the speed of said A-C motor driving said pump to control said flow of said fluid;
  an actuator mounted and connected to said stator to rotatably move said stator responsive to an electrical control signal;

a speed control potentiometer connected to an electrical signal source to emit an input signal and having its sliding contact connected to be moved by changes in said level of said fluid;

a feedback potentiometer connected to a signal source to emit a feedback signal and having its sliding contact connected to be moved as said rotatably movable portion of said stator is moved;

and means connected to said speed control potentiometer and said feedback potentiometer to compare said input signal and said feedback signal and to emit said electrical control signal proportional to a difference between said input and feedback signals for controlling said actuator.

References Cited

UNITED STATES PATENTS

| | | | |
|---|---|---|---|
| 2,439,239 | 4/1948 | Crever | 230—12 |
| 2,734,458 | 2/1956 | Hayes | 103—35 |
| 3,021,789 | 2/1962 | Ryden | 103—35 |
| 3,213,795 | 10/1965 | Parks et al. | 103—35 |
| 3,280,928 | 10/1966 | Roe | 318—214 X |
| 3,290,574 | 12/1966 | Roe | 318—214 X |

FRED C. MATTERN, JR., *Primary Examiner.*

W. J. KRAUSS, *Assistant Examiner.*